(12) United States Patent
Minter

(10) Patent No.: US 7,247,802 B1
(45) Date of Patent: Jul. 24, 2007

(54) SCALE PAN DESIGNED TO PASS RF SIGNALS WITH MINIMAL INTERFERENCE

(75) Inventor: Joshua B. Minter, Atlanta, GA (US)

(73) Assignee: NCR Corporation, Dayton, OH (US)

( * ) Notice: Subject to any disclaimer, the term of this patent is extended or adjusted under 35 U.S.C. 154(b) by 52 days.

(21) Appl. No.: 11/355,629

(22) Filed: Feb. 16, 2006

(51) Int. Cl.
*G01G 21/28* (2006.01)

(52) U.S. Cl. .................. 177/25.15; 177/262; 177/238; 235/383; 235/462.43; 343/912

(58) Field of Classification Search ............. 177/25.15, 177/238, 262; 235/383, 462.43; 343/912
See application file for complete search history.

(56) References Cited

U.S. PATENT DOCUMENTS

| | | | |
|---|---|---|---|
| 4,821,821 A | * | 4/1989 | Kelley ........................ 177/181 |
| 5,869,788 A | * | 2/1999 | Gordon et al. .............. 177/124 |
| 6,595,421 B2 | | 7/2003 | Detwiler |
| 6,764,010 B2 | | 7/2004 | Collins, Jr. et al. |
| 6,854,647 B2 | | 2/2005 | Collins, Jr. et al. |
| 6,886,746 B1 | | 5/2005 | Edwards |

\* cited by examiner

*Primary Examiner*—Randy W Gibson
(74) *Attorney, Agent, or Firm*—Paul Maginot

(57) ABSTRACT

A checkout station comprises a deactivation system having an antenna for transmitting a signal to the security feature on a product passing over the checkout station to deactivate the security feature and a scale for weighing the product at the checkout station. A composite weigh plate is supported by the scale and includes a metal face plate configured to support the product thereon for weighing the product and a metal sub-frame configured to support the face plate. The face plate and the sub-frame each define a slit so that they do not form a closed electrically conductive loop. An electrically non-conductive bonding agent fixes the metal face plate to the metal sub-frame to maintain the structural integrity of the composite weigh plate in spite of the presence of the slits in the metal components.

14 Claims, 4 Drawing Sheets

SCALE PAN DESIGNED TO PASS RF SIGNALS WITH MINIMAL INTERFERENCE

BACKGROUND

The present invention relates to weigh scales used in a checkout system in which products are weighed prior to purchase. More particularly, the invention concerns weigh scales adapted for use with security features of the checkout system.

Checkout terminals have evolved to incorporate components that automatically scan a bar coded price and product identifier and that automatically weigh an item. These checkout terminals may be attended by a cashier or may form part of a self-service checkout facility in which the customer performs the scanning and weighing steps. A typical checkout terminal of this type includes a scanning station that may be in the form of the station 10 shown in FIG. 1. This scanning station includes a vertical scanner assembly 12 with a housing 13 containing the scanning hardware and a window 14 through which the scanning process occurs. The station also includes a horizontal scanner assembly 16 with a housing 17 and window 18 similar to the vertical assembly. Both scanner assemblies 12, 16 include hardware that allows the station 10 to read an identification tag associated with each item being purchased at the station. In a typical case, the identification tag is a bar code that bears encoded information about the item, such as the SKU number and price. In a station like the one shown in FIG. 1, the two scanner assemblies allow the bar code to be read from different angles.

As shown in the view in FIG. 2, the horizontal scanner assembly includes a barcode reader 20 with its own window 21 that coincides with the window 18. A similar reader is mounted within the housing 13 for the vertical scanning assembly.

Incorporated into the scanning station 10 is a weigh plate 24 (FIG. 1) on which items to be purchased are placed to be weighed. The weight plate supports the window 18 so that the barcode reader 20 beneath can operate. The weight plate is carried by support posts 25 (FIG. 2) that project from an electronic scale 26. As is known in the art, the scale may be used to simply weigh produce or may be used to verify a scanned item by comparing the measured weight to an expected weight stored in a database.

Many retail establishments utilize security features associated with certain products. These security features are typically in the form of a tag carried by or affixed to the product. The security tag includes a resonant circuit with an integral capacitor which is effective for activating an alarm at the store exit when detected by corresponding sensing equipment. These types of security tags can be deactivated by transmitting a suitable signal from an antenna that short circuits the capacitor to disable the resonant circuit. Thus, many scanning stations also include an antenna and deactivation system, such as the system 28 and coil 29 shown in FIG. 2. As illustrated, the system and coil 28, 29 are oriented directly below the weigh plate 24 (FIG. 1).

In a typical scanning station, the weigh plate 24 is a stainless steel plate because it is easy to clean and pleasing to the eye. However, the plate may interfere with the function of the deactivation system 28 and its coil antenna 29. In one mode, the weigh plate creates a closed loop that disrupts the eddy currents of the magnetic pulse generated by the deactivation system. This phenomenon attenuates the signal range of the coil 29 so that the deactivation system may work only intermittently, if at all.

In one approach to solving this problem, the metal frame of the weigh plate is split around the window 18 and incorporating a non-metallic, or plastic, structure beneath and supporting the metal plate. However, it has been found that this approach compromises the stiffness of the weigh plate which becomes highly problematic when used with low profile, high-sensitivity weigh scale technology. This scale technology typically utilizes a four load cell planar beam configuration, as represented by the four support posts of the scanning station shown in FIG. 2. The reduced stiffness means that the weigh scale can deflect under the load of an item placed thereon, which ultimately means that the measured weight will be less than the actual weight of the product. Moreover, any deflection of the weigh plate beyond a specified range can cause side loading of the load cells, which also contributes to weighing errors.

There is a need for a weigh plate construction that does not interfere with the optimal performance of the security tag deactivation systems associated with a checkout terminal or scanning station. This need must be satisfied without compromising the performance of the weigh scale, especially for low profile, high accuracy scales such as the four load cell planar beam configurations.

SUMMARY OF THE INVENTION

To address these problems, the present invention contemplates a checkout station that comprises a deactivation system having an antenna for transmitting a signal to the security feature on a product passing over the checkout station to deactivate the security feature and a scale for weighing the product at the checkout station. A composite weigh plate is supported by the scale and includes a metal face plate configured to support the product thereon for weighing the product and a metal sub-frame configured to support the face plate.

In one feature of the invention, the face plate and the sub-frame each define a slit so that they do not form a closed electrically conductive loop. The slits are offset relative to each other to maintain the structural integrity and resistance to bending under the load of a product placed on the weigh plate.

In a further feature, an electrically non-conductive bonding agent fixes the metal face plate to the metal sub-frame. This bonding agent prevents any closed loop conductive path between the two metal components. Moreover, the bonding agent helps maintain the structural integrity of the composite weigh plate in spite of the presence of the slits in the metal components.

It is an object of the invention to provide a weigh plate that is structurally sound but avoids interference with scanning and security deactivation components associated with a checkout or scanning terminal. Other objects and particular benefits of the invention will be apparent from the following written description together with the accompanying figures.

DESCRIPTION OF THE PREFERRED EMBODIMENTS

Figure 1:
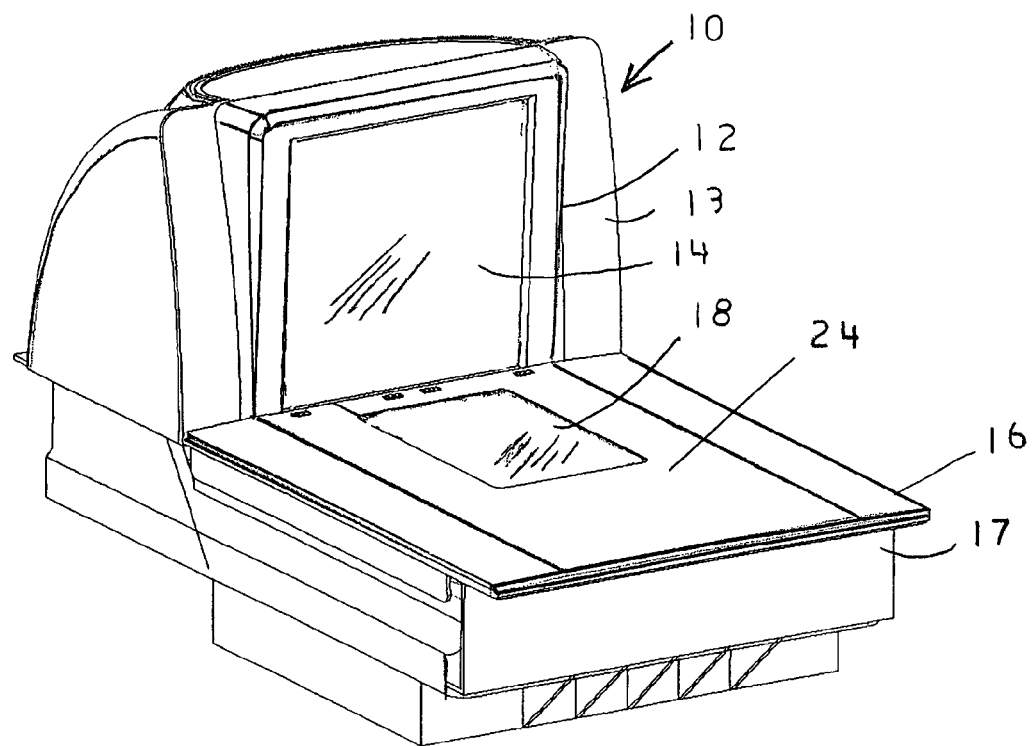
FIG. 1 is a perspective view of a scanning station for use with a checkout terminal.
Figure 2:
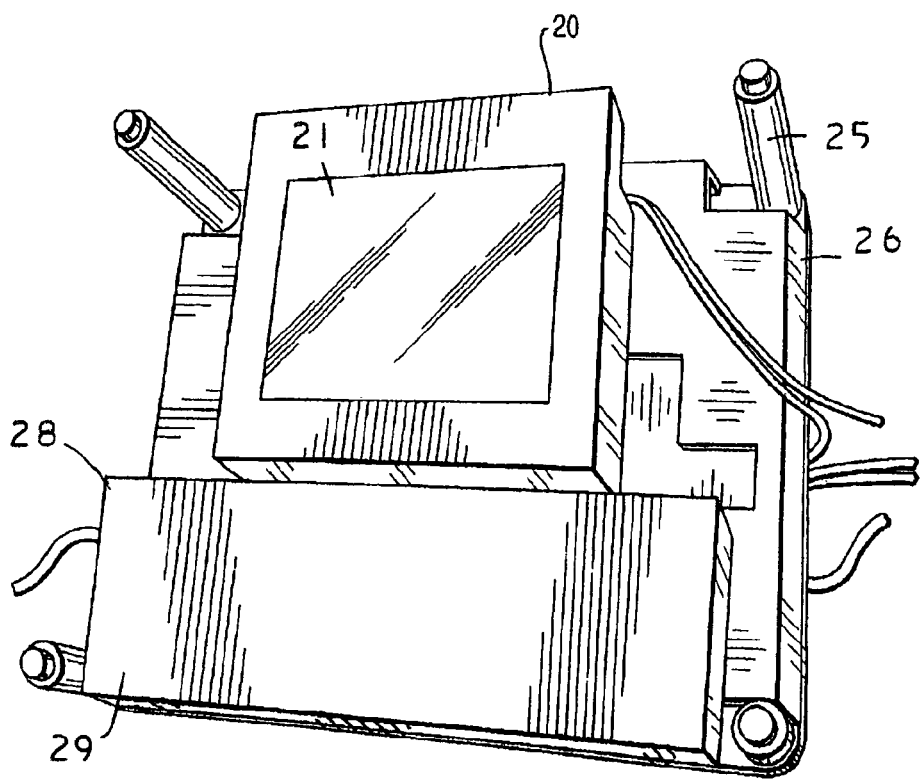
FIG. 2 is a top view of components within the horizontal scanner assembly of the scanning station shown in FIG. 1.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 3:
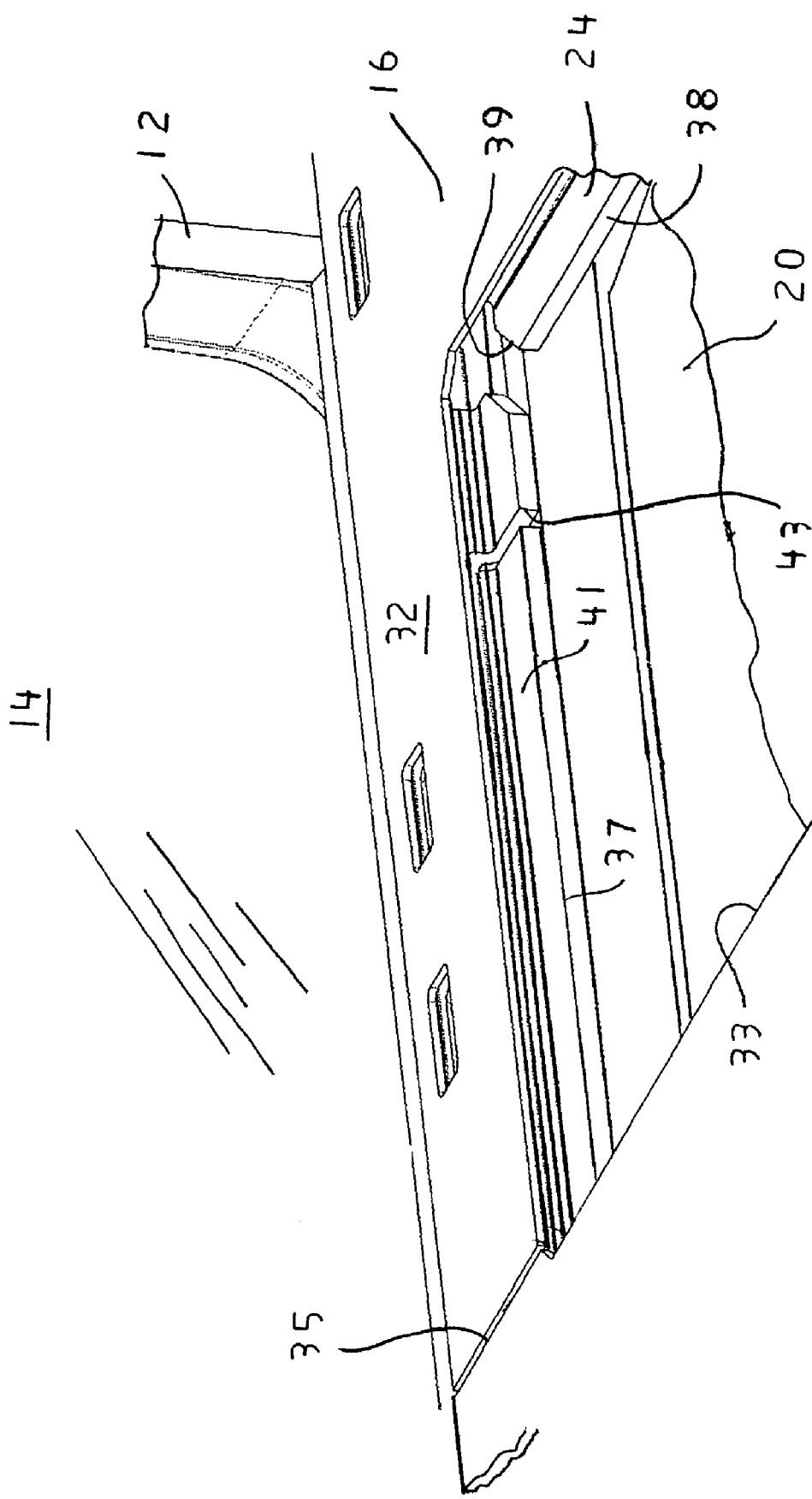
FIG. 3 is a cut-away perspective view of a weigh plate, according to one embodiment of the invention, for use in a scanning station such as the station depicted in FIGS. 1-2.

In accordance with one feature of the invention, the weigh plate 24 is provided as a composite structure. The structure includes a cosmetic face plate 32 formed of stainless steel. The face plate defines an opening 33 for access to the window 18 (FIG. 1). In order to eliminate a closed loop condition in the metallic component, a slit 35 is formed in the face plate 32. Preferably, the slit is arranged across the narrowest segment of the face plate, as depicted in FIG. 3, to reduce the length of the slit and to minimize the impact on the structural integrity of the face plate. The slit may be laser cut into the face plate, preferably after the sheet material has been formed or bent into its final configuration.

In accordance with a further aspect of the invention, the face plate 32 is supported by a sub-frame 37. The sub-frame is preferably formed from sheet metal in a stamping or bending operation. The sub-frame defines a reader opening 38 for access to the barcode reader 20 beneath. To facilitate forming the sheet metal sub-frame into a contiguous perimeter, the frame may include notches 39 at the corners at the reader opening 38 (FIG. 3). Since the sub-frame is also metal, a slit 43 is formed across the entire width of the sub-frame in order to eliminate the closed loop condition discussed above. In a further feature of the invention, the slit 43 in the sub-frame 37 is offset from the slit 35 in the face plate 32. This feature ensures the structural integrity of the composite weigh plate 24 so that neither metal plate bends as a load is passed across the plate.

Figure 4:
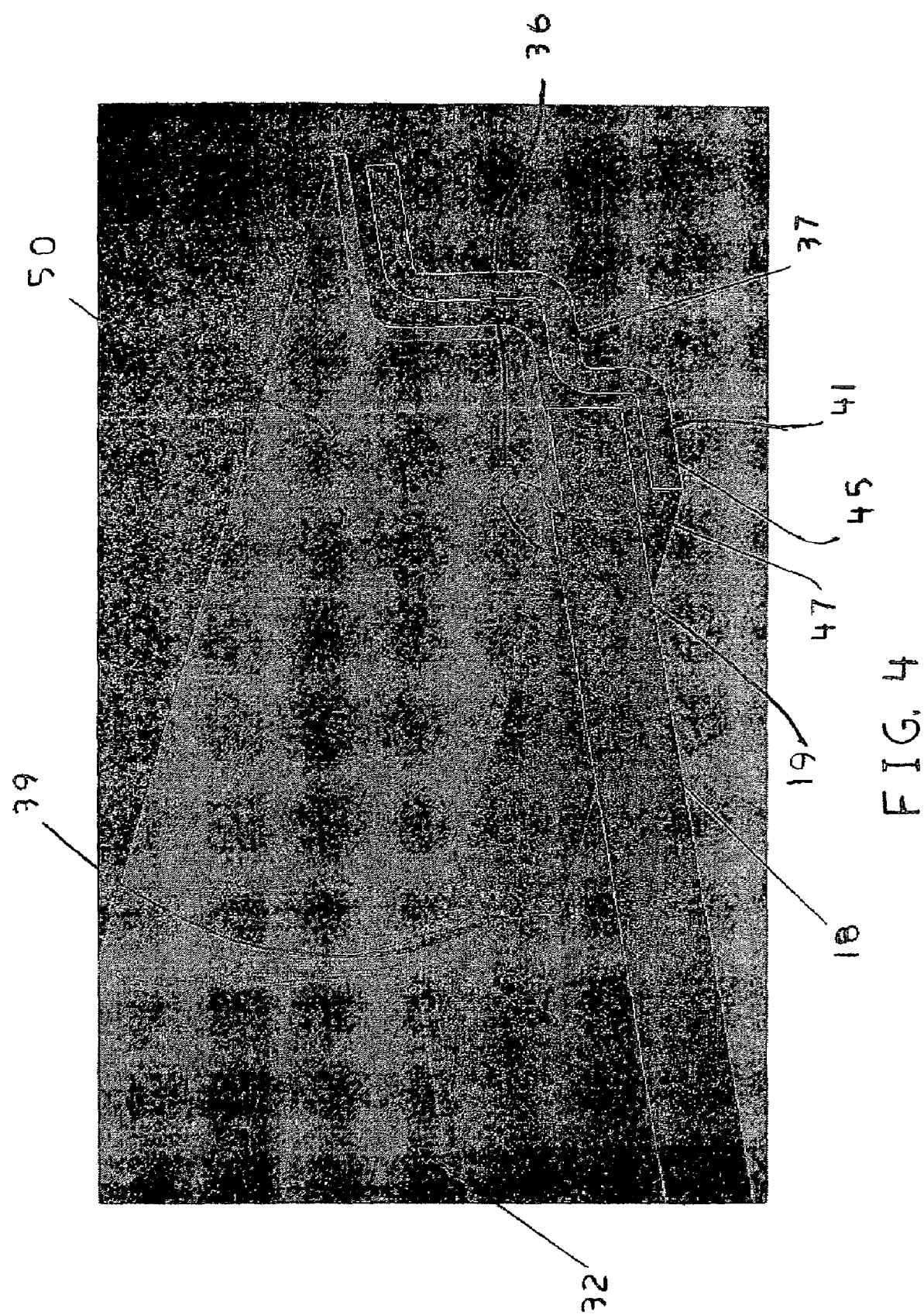
FIG. 4 is an enlarged cross-sectional perspective view of the composite weigh plate shown in FIG. 3.

The sub-frame 37 defines a window support flange 41 that cooperates with a portion 36 of the face plate 32 to sandwich the window 18. As depicted in FIG. 4, the portion 36 of the face plate 32 may be formed to complement the flange 41 of the sub-frame. The window 18 may include a notch 19 to accept the portion 36 and fix the window against slippage relative the face plate.

In order to complete the composite structure of the weigh plate 24, the face plate is affixed to the sub-frame 37 using an electrically non-conducting bonding agent 45 between the metal plates. In a preferred embodiment, the bonding agent is a VHB™ Tape manufactured and sold by 3M Corporation. The VHB™ Tape adheres readily to metal surfaces, requiring only pressure to achieve adhesion to the surfaces. A similar layer 47 of VHB™ Tape is provided between the portion 36 of the face plate 32 and the window 18. Thus, in the preferred embodiment, the VHB™ Tape layer 45 is applied to the sub-frame 37, including around the window support flange 41. The VHB™ Tape layer 47 is applied to the portion 36 of the face plate. The window 18 is positioned on the VHB™ Tape layer 45 at the window support flange 41 and then the face plate is mounted over this intermediate structure. Pressure applied to the metallic sub-frame and face plate causes the tape layers 45, 47 to firmly adhere to the corresponding surfaces, thereby completing the composite weigh plate structure.

Figure 5:
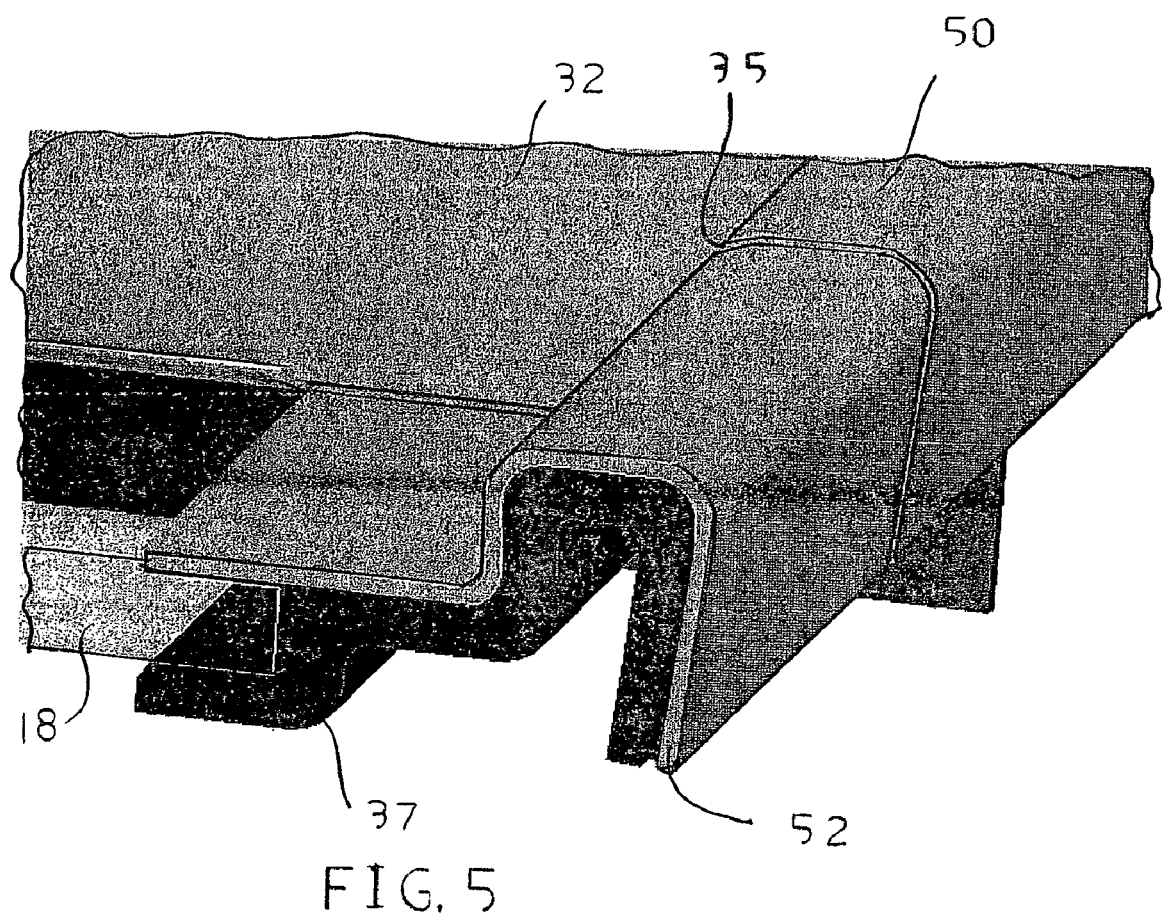
FIG. 5 is an enlarged partial cross-section of the composite weight plate shown in FIG. 4.

Shear resistance is provided by an end flange 50, shown in FIGS. 4-5. Preferably the end flange is situated only at one end of the weigh plate 24, and most preferably adjacent the vertical scanner assembly 12 (FIG. 1) so that the flange does not impede the movement of product across the scanner and weigh plate. Additional strength and shear resistance is provided by bending the end flange 50 to form an undercut flange 52, as shown in FIG. 5. The VHB™ Tape layer 45 is sufficiently resilient to accept the bends necessary to form the end flange 50 and the undercut flange 52.

The composite nature of the weigh plate structure of the present invention allows the metal plates 32, 37 to incorporate the corresponding slits 45, 43 that span the entire width of one leg of each plate. These slits break the closed loop characteristics that would otherwise be present with a continuous metal structure, which thereby keeps the plates from disrupting the eddy currents generated by the deactivation system 28 and coil 29. Using two plates to form the weigh plate maintains the structural integrity of the weigh plate in spite of the presence of the slits. The bonding agent, in particular the VHB™ Tape layers 45, 47, tightly fix the two metal sheets together so that the slits in one plate are supported by a continuous surface in the other plate. Moreover, the electrically non-conductive bonding agent electrically isolates one plate from the other so that the two plates can't combine to form a conductive loop.

The present invention allows the use of metallic components that are typically favored for checkout or scanning stations, particularly high use stations or checkout facilities at a grocery store where sanitary considerations are important. The metallic components also provide the greatest resistance to deformation or bending under the weight of a product being scanned and/or weighed at the station.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A checkout station, comprising:

a deactivation system having an antenna for transmitting a signal to the security feature on a product passing over the checkout station to deactivate the security feature;

a scale for weighing the product at the checkout station; and a composite weigh plate supported by the scale, said weigh plate including;

a metal face plate configured to support the product thereon for weighing the product, said metal face plate defining a first slit so that the face plate does not form a closed electrically conductive loop;

a metal sub-frame configured to support the metal face plate, said sub-frame defining a second slit so that the sub-frame does not form a closed electrically conductive loop; and an electrically non-conductive bonding agent fixing said metal face plate to said metal sub-frame.

2. The checkout station of claim 1, further comprising:
   an optical scanner apparatus; and
   a window positioned between said face plate and said sub-frame, wherein said face plate and said sub-frame define overlapping openings for optical access to said scanner apparatus.

3. The checkout station of claim 2, wherein said face plate and said sub-frame define opposing portions arranged to sandwich said window therebetween.

4. The checkout station of claim 3, wherein said bonding agent is disposed between said window and said opposing portions.

5. The checkout station of claim 1, wherein said bonding agent is VHB™ Tape.

6. The checkout station of claim 1, wherein said first and second slit are offset relative to each other.

7. The checkout station of claim 1, wherein said composite weigh plate defines an end flange at one end thereof, and further wherein said face plate and said sub-frame are each bent to define said end flange.

8. A composite weigh plate for use with a scanning checkout terminal, comprising:
   a metal face plate configured to support a product thereon for weighing the product, said metal face plate defining a first slit so that the face plate does not form a closed electrically conductive loop;
   a metal sub-frame configured to support the metal face plate, said sub-frame defining a second slit so that the sub-frame does not form a closed electrically conductive loop; and
   an electrically non-conductive bonding agent fixing said metal face plate to said metal sub-frame.

9. The composite weigh plate of claim 8, further comprising:
   a window positioned between said face plate and said sub-frame, wherein said face plate and said sub-frame define overlapping openings for optical access through said window.

10. The composite weigh plate of claim 9, wherein said face plate and said sub-frame define opposing portions arranged to sandwich said window therebetween.

11. The composite weigh plate of claim 10, wherein said bonding agent is disposed between said window and said opposing portions.

12. The checkout station of claim 8, wherein said bonding agent is VHB™ Tape.

13. The checkout station of claim 8, wherein said first and second slit are offset relative to each other.

14. The checkout station of claim 8, wherein said composite weigh plate defines an end flange at one end thereof, and further wherein said face plate and said sub-frame are each bent to define said end flange.

* * * * *